United States Patent [19]

Smith et al.

[11] 4,315,873
[45] Feb. 16, 1982

[54] COOLING EQUIPMENT

[75] Inventors: Ennis C. Smith, Houston, Tex.; Addison Y. Gunter, deceased, late of Gainesville, Tex., by Ann R. Gunter, executrix

[73] Assignee: Hudson Products Corporation, Houston, Tex.

[21] Appl. No.: 973,634

[22] Filed: Dec. 27, 1978

Related U.S. Application Data

[63] Continuation of Ser. No. 853,516, Nov. 21, 1977, abandoned.

[51] Int. Cl.³ .............................................. F28C 1/06
[52] U.S. Cl. ................................ 261/158; 261/23 R; 261/DIG. 11; 261/DIG. 77
[58] Field of Search ........ 261/158, 21, 23 R, DIG. 11, 261/DIG. 77; 165/DIG. 1

[56] References Cited

U.S. PATENT DOCUMENTS

| | | | |
|---|---|---|---|
| 1,673,732 | 6/1928 | Brooks | 261/DIG. 11 |
| 1,687,542 | 10/1928 | Carrier | 261/DIG. 11 |
| 2,680,603 | 6/1954 | Taylor | 261/DIG. 11 |
| 2,732,190 | 1/1956 | Mart | 261/21 |
| 3,363,885 | 1/1968 | Meek | 261/111 |
| 3,900,301 | 8/1975 | Constantinescu | 261/DIG. 11 |
| 3,995,689 | 12/1976 | Cates | 261/158 |
| 4,007,241 | 2/1977 | Phelps | 261/DIG. 11 |
| 4,022,853 | 5/1977 | Schulenberg | 261/DIG. 11 |
| 4,039,307 | 8/1977 | Bondor | 261/21 |

FOREIGN PATENT DOCUMENTS 37480  1/1964  Fed. Rep. of Germany ... 165/DIG. 1

Primary Examiner—Gregory N. Clements
Attorney, Agent, or Firm—Marvin B. Eickenroht; Jennings B. Thompson

[57] ABSTRACT

There is disclosed cooling equipment wherein air is caused to pass through a wet cooling tower section and thus precooled prior to passage across the tube bundle of a dry cooling tower section through which a medium to be cooled is circulated, and then either selectively vented or recirculated successively through the wet section and across the tube bundle.

3 Claims, 5 Drawing Figures

COOLING EQUIPMENT

This is a continuation of application Ser. No. 853,516 filed Nov. 21, 1977, abandoned.

This invention relates to equipment including a dry cooling tower section having a tube bundle through which a medium to be cooled is circulated and over which air is passed to cool the medium. More particularly, it relates to improved equipment of the type shown in U.S. Pat. No. 2,945,926, wherein the air is passed through a wet cooling tower section upstream of the dry section where it may be humidified and thus cooled prior to passage over the tube bundle of the dry section.

With such equipment, it is possible to cool the medium to a greater extent than is possible with ordinary dry cooling towers, and/or to reduce the size of the tube bundle surface and thus the cost of the dry section. Since the wet section may be used only when required—i.e., in hot climates—such equipment was designed primarily for use in areas where water is at a premium. Also, the water may be process fluid or makeup water, and thus corrosive or brackish, without detracting from the overall operation of the equipment.

However, environmental considerations make it difficult to dispose of contaminated water in a conventional manner. Although efforts have been made to dispose of it by evaporation, conventional equipment for this purpose is quite expensive. It has therefore been proposed to evaporate the water in the wet section of equipment of the type above described, at least in those areas where such equipment is otherwise useful for the reasons above noted.

However, when used in the ordinary manner—i.e., only in hot weather—this equipment has limited evaporating capacity. On the other hand, the danger of freeze up of both liquid medium in the tube bundles and water in the wet section during periods of low ambient temperature normally prevents use of this equipment as other than a hot weather peaking device. Furthermore, solids in the water often used to precool the air in the wet section settle out in the tray above the fill, and depending on the concentration of the contaminants, this may require that the tray be cleaned frequently, thus putting the entire equipment out of service.

An object of this invention is to provide equipment of this type which, while serving its original purpose, is capable of evaporating considerably more water, and, more particularly, of such construction that ambient air may be precooled in the wet section on a continuous year round basis without danger of freeze up.

Another object is to provide cooling equipment of this or other types having a wet cooling tower section requiring a minimum of maintenance even when the water contains a high concentration of solids.

These and other objects are accomplished, in accordance with the illustrated embodiment of this invention, by equipment of this type having a housing which encloses the inlet to the wet section, the outlet from the dry section, and other outer side and top walls of said sections. More particularly, the housing has means for selectively venting air which has passed through the web section and across the tube bundle or recirculating it successively through the wet section and across the tube bundle of the dry section. In this manner, the wet section may be operated not only to precool the air during the summer months, but also during the winter months, because the recirculated air is sufficiently warm to prevent freeze up of either water in the wet section or liquid medium in the tubes of the tube bundle. Furthermore, since recirculation of the air increases its temperature over that of the ambient air, more water may be evaporated due to the increased ability of the air to take on the water through which it passes in the wet section. Preferably, a means is provided for mixing ambient air with air which is recirculated, in any desired proportions, thereby making the equipment more adaptable and flexible in climates which are neither particularly hot nor particularly cold.

More particularly, the housing has a first portion which encloses the inlet to the wet section, a second portion enclosing the outlet from the dry section, and a first opening connecting the first and second portions. The first housing portion has a second opening for admitting air therethrough, the second housing portion has a third opening to vent air therefrom, and means such as adjustable louvers are provided for controlling the flow of air through the first, second and third openings. Thus, the first opening may be closed and the second and third openings opened to cause ambient air passing through the wet section and across the tube bundle of the dry section to be vented from the dry section, or, alternatively, the second and third openings may be closed and the first opening opened to cause air to be recirculated through the wet section and across the tube bundle.

In its preferred and illustrated embodiment, the housing has a fourth opening in the first portion to admit ambient air thereto, and means such as adjustable louvers for controlling the admission of air thereto. Thus, the second opening may be closed, and the first, third and fourth openings partially opened to cause ambient and recirculated air to be combined prior to passage through the wet section. Thus, this equipment makes it possible to pass 100% ambient air once through the wet section, to recirculate 100% of the air therethrough, or to pass mixtures of the two in any desired proportion.

In accordance with another novel aspect of the present invention, the cooling tower of the wet section comprises, as compared with conventional cooling towers of this type, a plurality of side-by-side trays above the fill each for distributing water over a portion thereof, and a plurality of side-by-side sumps below the fill each for collecting water therefrom, with the trays and sumps being arranged in pairs one above the other so that water distributed from the tray of each pair is collected in the sump thereof. More particularly, means are provided for supplying water to a first tray, and for discharging water from a last sump, together with means for lifting water from the first and each additional sump intermediate the first and last sump and supplying it to a successive tray. Thus, the water flows in series rather than in parallel fashion, so that as evaporation takes place in each section, the solids are more highly concentrated in the subsequent section, and the water in the last tray contains the greatest concentration of solids. As a consequence, it is contemplated that only the interior of the tower modules and trays of the last such sections will require frequency cleaning, and only that part of the overall tower be taken out of operation.

In the drawings, wherein like reference characters are used throughout to designate like parts:

Figure 2:
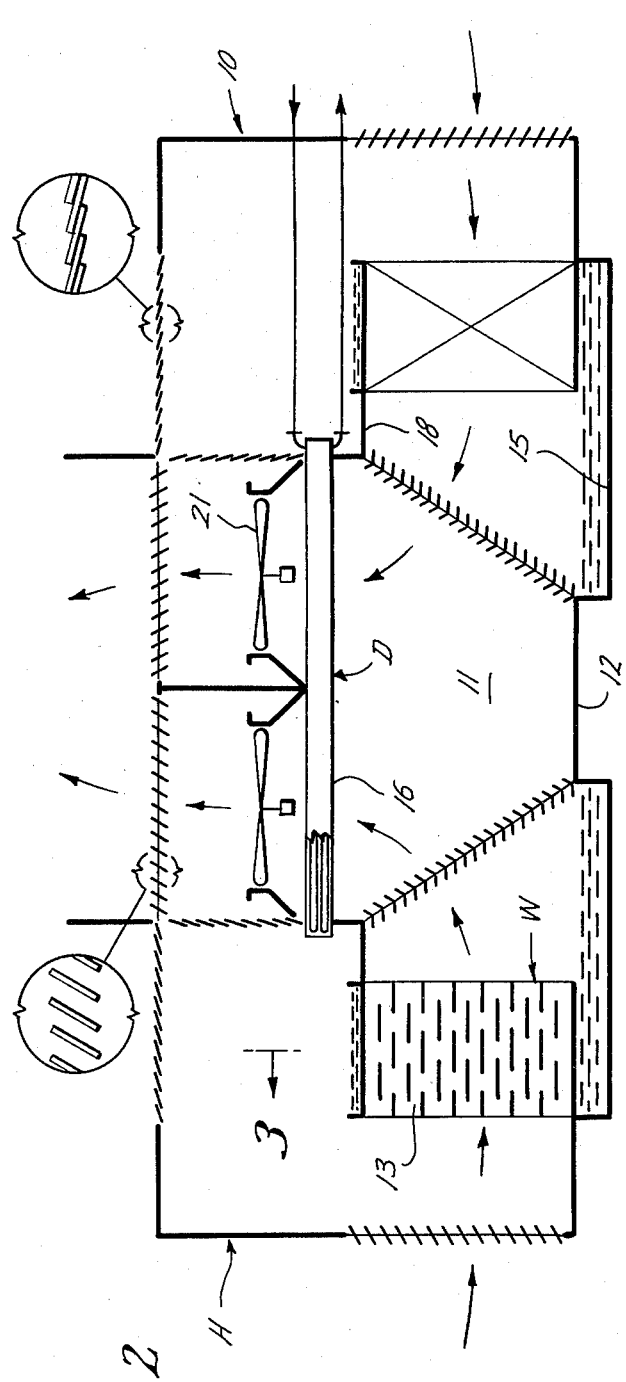
FIG. 2 is a cross-sectional view of such equipment, as seen along broken lines 2—2 of FIG. 1, and with the louvers in the housing openings arranged to cause air which passes successively through the wet section and across the tube bundle of the dry section to be vented from the dry section.
Figure 4:
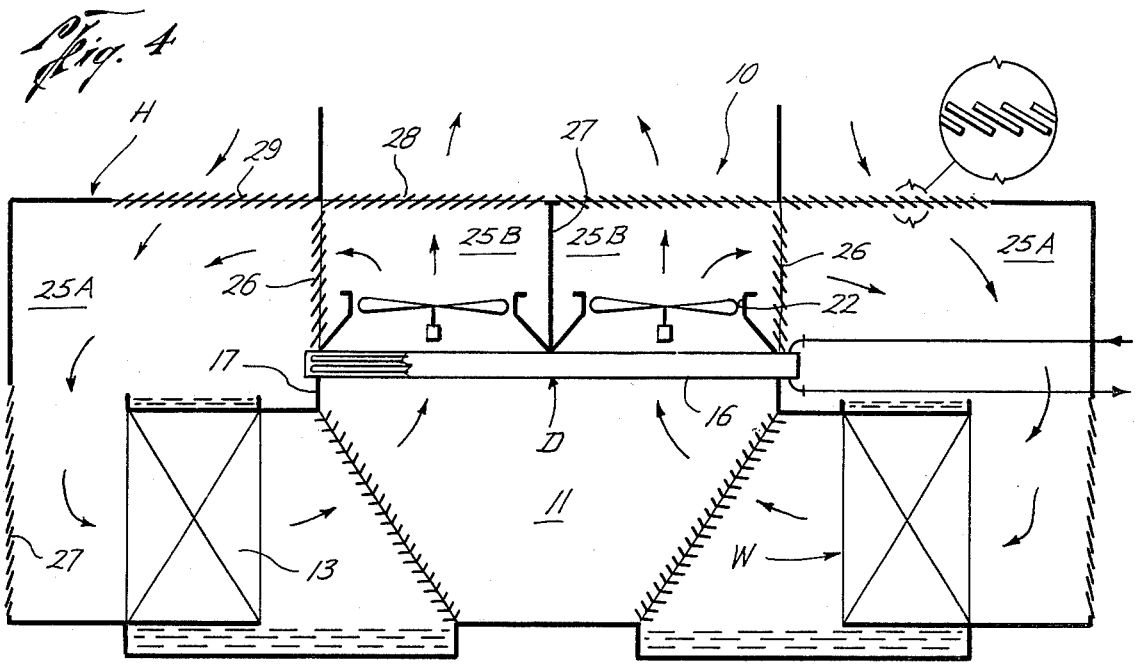
Figure 5:
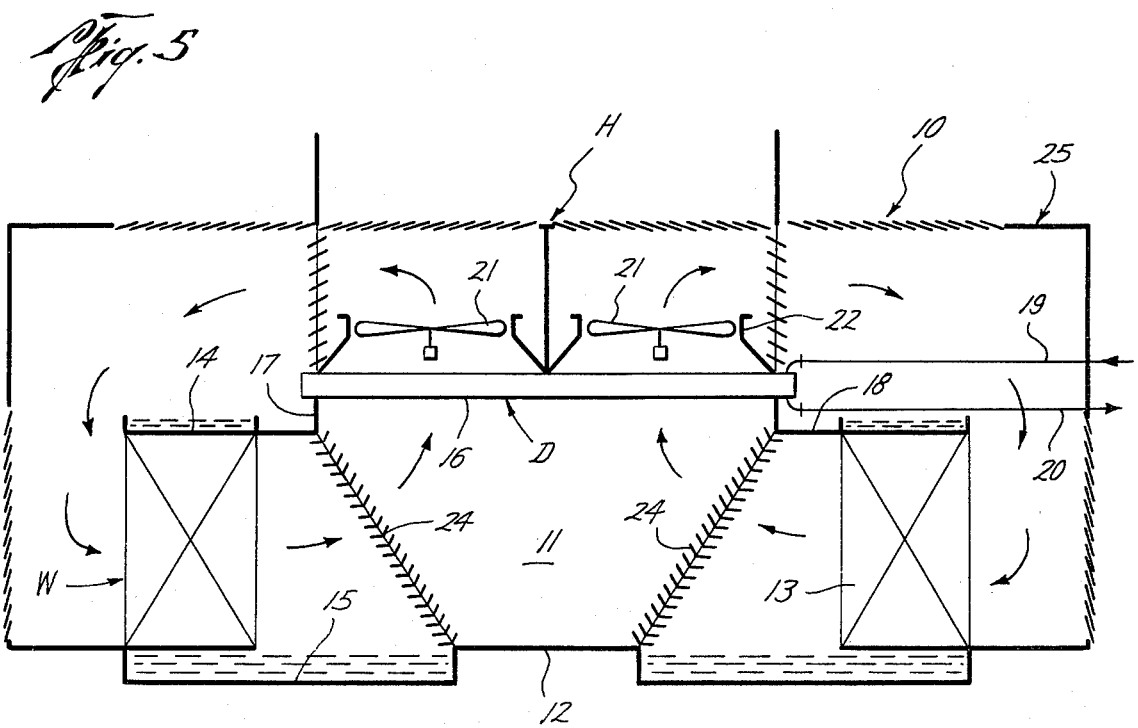

FIG. 4 is another cross-sectional view of the equipment, similar to FIG. 2, but with the louvers in the housing openings arranged to cause part of the air which passes successively through the wet section and across the tube bundle of the dry section to be vented from the dry section and the remainder thereof to be combined with ambient air for recirculation through the wet and dry sections; and FIG. 5 is another cross-sectional view of the equipment, similar to FIGS. 2 and 4, but with the louvers in the housing openings arranged to recirculate all of the air which passes successively through the wet section and across the tube bundle of the dry section.

Figure 1:
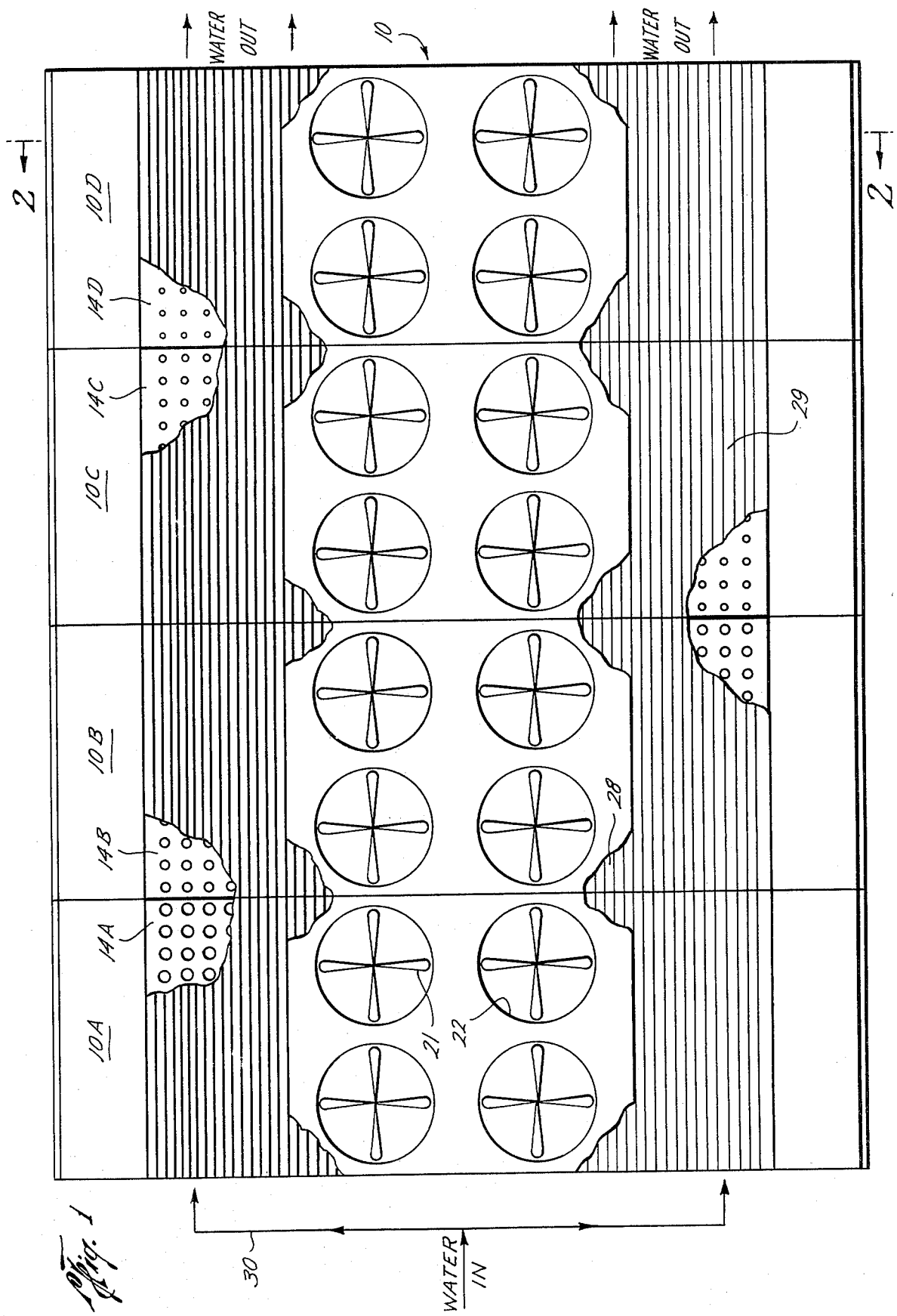
FIG. 1 is a top plan view, broken away in part, of equipment constructed in accordance with the present invention.

With reference now to the details of the abovedescribed drawings, the overall equipment, which is designated in its entirety by reference character 10, includes a pair of wet cooling tower sections W extending longitudinally in laterally spaced-apart, parallel relation, and a dry cooling tower D extending longitudinally intermediate the wet sections above an air chamber or plenum 11 which is common to both wet sections and has a bottom wall 12 extending laterally beneath them. As previously mentioned, and as will be described in detail to follow, equipment 10 also includes a housing H which encloses the inlet to the wet section, the outlet from the dry section, and other outer side and top walls of the sections. As best shown in FIG. 1, the overall equipment, including the wet and dry sections and housing H have inner vertical walls which divide it longitudinally into end-to-end modules 10A, 10B, 10C and 10D, and outermost vertical walls which close the outer ends of the outermost modules.

Each wet section module is of more or less conventional construction in that it has fill 13 over which water is adapted to be distributed from a tray 14 thereabove and from which water is collected in a sump 15 therebelow. As well known in the art, the fill has a large surface area, such as a series of staggered slats, as indicated diagrammatically in FIG. 2, so as to promote contact of water with air passing laterally through the wet section.

Each dry section module is also of more or less conventional construction in that it includes a tube bundle 16 having tubes extending laterally across an opening defined between the side walls 17 of the frame of the dry section which connect at their lower ends with the top walls 18 of the frame of the wet section. A fluid medium to be cooled is circulated through the tubes of the bundle 16 by means of inlet and outlet conduits 19 and 20, and air is caused to flow upwardly across the tube bundle by means of two banks of fans 21 each mounted within a fan ring 22 supported on the frame of the dry section above the bundle. The banks of fans are separated from one another by a vertical wall 27A of the dry section frame so that each bank draws air primarily from the wet section adjacent thereto.

As indicated by the arrows of FIGS. 2, 4 and 5, air which is drawn across the bundle is first caused to pass from the inlet to the outlet and thus through fill 13 of each wet section, and then into and through the plenum 11. As will be described below, when the air has been drawn across the bundle and out the fan ring at the outlet of the dry section, it is either vented from the housing or recirculated therein, or partially vented and recirculated. Preferably, mist eliminators 24 are mounted in the plenum intermediate each wet section outlet and dry section inlet for the purpose well known in the art.

Housing H is divided into first portions 25A each of which encloses the inlet to one of the wet sections, and second portions 25B each enclosing the outlet from one bank of fans of the dry section. More particularly, the housing portions have top walls which merge to form a top wall for the housing, and the first housing portions also have side and bottom walls which, with the top wall, enclose not only the inlet to the wet section and outlet from the dry section, but also the other outer side and top walls of the sections.

The first and second housing portions are separated from one another by common side walls having louvered openings 26 therein, so as to control the flow of air from each second portion to the adjacent first portion. As also shown in the drawings, the side walls of first housing portions are also provided with louvered openings 27, so as to control the admission of ambient air thereto, and thus to the inlet to each wet section. Also, the top walls of the second housing portions are provided with louvered openings 28 so as to control the venting of air from such portions, and the top wall of the first housing portions are provided with louvered openings 29 to control the admission of ambient air to such first portion 25, and thus, similarly to the louvered opening 27, the admission of ambient air to the inlet to each wet section.

During the hottest part of the year, the louvered openings may be arranged to operate the equipment in convention fashion. That is, louvers 26 and 29 may be closed, and louvers 27 and 28 opened, as illustrated in FIG. 2, to cause ambient air to pass through the wet section, across the tube bundle 16 of the dry section, and then vented to the atmosphere. However, during the coldest part of the year, and particularly during subfreezing temperatures, the louvers 27, 28 and 29 may be closed, and louvers 26 fully opened, as shown in FIG. 5, so as to recirculate air successively through the wet and dry sections. During more moderate temperatures, it may be preferable to pass a mixture of ambient and recirculated air through the sections, in which case, as shown in FIG. 4, louvers 27 are closed and louvers 26, 28 and 29 are partially opened, so as to combine ambient air with some of the recirculated air, and vent the remainder thereof.

As previously described, the foregoing arrangement enables operation of the wet sections of the tower during all weather conditions and thus the whole year around. This in turn permits water to be evaporated in the wet section during the entire year, or at least during other than the hottest temperatures. More particularly, this is made possible by virtue of the fact that the recirculated air is sufficiently warmed as to prevent freeze up. As also possibly previously described, the warmer air which is recirculated through the wet sections has increased ability to evaporate the water over ambient air at a lesser temperature.

Figure 3:
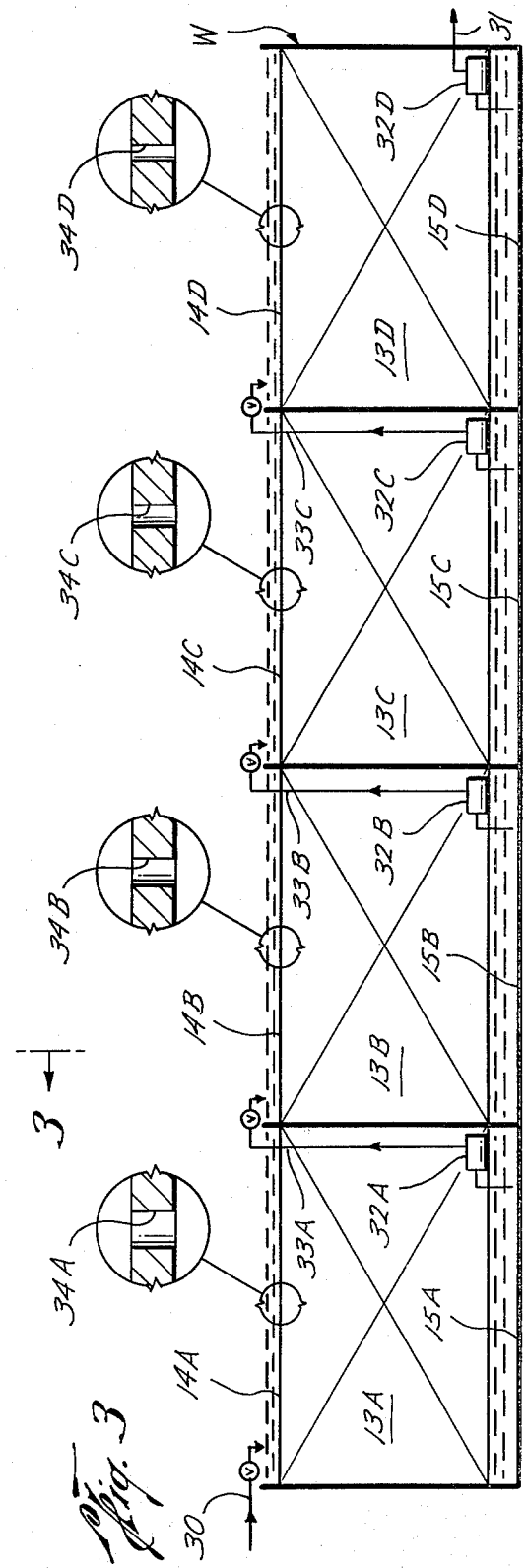
FIG. 3 is a longitudinal cross-sectional view of equipment, as seen along broken lines 3—3 of FIG. 2.

As previously described, and as best shown in FIGS. 1 and 3, the cooling tower of each wet section module includes an individual tray and an individual sump disposed above and below, respectively, fill 13. Thus, with the overall equipment divided into four modules, as illustrated, there are four separate trays 14A, 14B, 14C and 14D, and a corresponding number of separate sumps 15A, 15B, 15C and 15D. More particularly, and as shown in FIG. 3, the vertical walls which divide the equipment into modules extends to the bottom of each sump that it, like each of the trays, is separate from the others. Thus, there are four pairs of trays and sumps, each tray of each pair serving to distribute water over the fill which is collected in the sump of the pair beneath it.

Water is supplied to a first tray 14A through conduit 30, and a portion of this water, which remains after evaporation in all four modules, is discharged or blown down from a last sump 15D through conduit 31. As previously described, this invention contemplates that the water will be corrosive or brackish and contain a large concentration of solids. In conventional equipment of this type, the water distributed by the trays flows in parallel fashion into the sump therebelow. According to the present invention, however, the water is in effect caused to flow in series fashion from one cooling tower module to the next. Thus, as shown in FIG. 3, water which is collected in the first sump 15A is supplied by means of a pump 32A and a riser 33A to the tray 15B of the adjacent module. Then, water in the second sump 15B is supplied by means of a pump 32B and a riser 33B to the tray 14C of the third module, and water in the third sump 15C is supplied by means of a pump 32C and a riser pipe 33C to the tray 14D of the last module. Water collected in the sump 15D of the last module is supplied to discharge pipe 31 by means of a pump 32D.

Since evaporation takes place in each module, the amount of water supplied to each tray is less than that supplied to the preceding tray and the percentage of solids collected in each successive sump will be corresponding more. As a result, only water in the last sumps, or possibly only in the last sump, will have such a large concentration of solids as to require that it be cleaned with great frequency. This, of course, not only simplifies the maintenance of the equipment, but also, due to its modular construction, enables at least certain of the wet section modules to continue to operate while the trays of other modules are being cleaned.

Substantially equal heads of water may be maintained in each tray, despite the lesser volume of water supplied to each successive tray, means of holes in the bottom of each tray of successively smaller size. That is, as best illustrated by the blown-up portions of FIG. 3, holes 34A in tray 14A may be larger than the holes 34B in the bottom of tray 14B, while the holes 34B may be larger than the holes 34C in the bottom of tray 14C, and the holes 34C may in turn be larger than the holes 34D in the bottom of the tray 14D. Obviously, this same purpose may be accomplished by means of trays of successively smaller volume in the direction of water flow.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. Cooling equipment, comprising a wet cooling tower section having an air inlet, an air outlet, fill intermediate the inlet and outlet, and means for distributing water over the fill so as to cool air as it flows through the wet tower section, a dry cooling tower section having an inlet, an air outlet, and a tube bundle through which a cooling medium may be passed and over which air is caused to flow in passing through the dry tower section so as to cool the medium, means for causing air to pass successively through said wet section, into the inlet of said dry section, and across the tube bundle thereof, a housing having a first portion enclosing the inlet to the wet section, a second portion enclosing the outlet from the dry section, a first opening connecting the first and second portions, a second opening to admit air to said first portion, a third opening to vent air from the second portion, and means for controlling the flow of air through said first, second and third openings, whereby the first opening may be closed and the second and third openings opened to cause the air passing successively through said wet section and across the tube bundle of the dry section to be vented from said dry section, or the second and third openings may be closed and said first opening opened to cause said air to be recirculated through the wet section and across the tube bundle of the dry section.

2. Cooling equipment of the character defined in claim 1, wherein said housing has a fourth opening in its first portion to admit ambient air thereto, and means for controlling the flow of air through said fourth opening, whereby the second opening may be closed and the first, third and fourth openings partially opened to cause ambient and recirculated air to be combined prior to passage through said wet section.

3. A cooling tower, comprising a tower having an air inlet, an air outlet, and fill arranged in the path of the air from the inlet to the outlet, a plurality of trays above the fill for distributing water thereover, said trays being arranged in a row in side-by-side relation, said row extending in a direction transverse to the direction of air flow from the inlet to the outlet, a plurality of side-by-side sumps below the fill each for collecting water therefrom, the trays and sumps being arranged in pairs one above the other so that water distributed from the tray of each pair is collected in the sump thereof, means for supplying water to a first tray, means for discharging water from a last sump, means for lifting water from the first and each additional sump intermediate the first and last sump and supplying it to a successive tray, and means for maintaining substantially equal heads of water in each tray.

* * * * *